United States Patent [19]

Kobayashi et al.

[11] Patent Number: 4,489,352

[45] Date of Patent: Dec. 18, 1984

[54] VIDEO TAPE RECORDING/REPRODUCING APPARATUS HAVING AN AUTO TRACKING FUNCTION

[75] Inventors: Masaaki Kobayashi, Kawanishi; Masao Tomita, Neyagawa; Masayuki Matsumoto, Hirakata; Masahiro Honjo, Neyagawa; Kazuhiro Yamanishi, Higashiosaka, all of Japan

[73] Assignee: Matsushita Electric Industrial Co., Ltd., Osaka, Japan

[21] Appl. No.: 367,976

[22] Filed: Apr. 13, 1982

[30] Foreign Application Priority Data

Apr. 13, 1981 [JP] Japan .................. 56-56085

[51] Int. Cl.³ ............................................ H04N 5/783
[52] U.S. Cl. ................................... 360/10.3; 310/332
[58] Field of Search .................. 360/10.1, 10.2, 10.3, 360/77, 78; 358/312; 310/332, 317

[56] References Cited

U.S. PATENT DOCUMENTS 4,197,564  4/1980  Ravizza ..................... 360/10.3

Primary Examiner—Donald E. McElheny, Jr.
Attorney, Agent, or Firm—Wenderoth, Lind & Ponack

[57] ABSTRACT

A video signal recording/reproducing apparatus includes a first set of rotary heads mounted on a rotary disk and a second set of rotary heads mounted on head actuators which are also mounted on the rotary disk. The apparatus has two reproduction modes. A magnetic tape in the first reproduction mode is driven at a speed equal to the speed used in a recording mode. The magnetic tape in the second reproduction mode is driven at a speed which is different from the speed used in the recording mode. The apparatus has a negative feedback loop which detects the reproduced signal level of the second set of rotary heads and drives the head actuators in order to increase the reproduced signal level of the second set of rotary heads. In the first reproduction mode, the negative feedback loop is intermittently closed. At the period of time when the negative feedback loop is open, the negative feedback loop holds the value of its output signal to that of the last time period when the negative feedback loop was closed, and, in addition, the head actuator is not driven when the feedback loop is open. At a transitional period when the apparatus switches from the first reproduction mode to the second reproduction mode, a holding signal from the negative feedback loop is supplied to the head actuator.

2 Claims, 6 Drawing Figures

VIDEO TAPE RECORDING/REPRODUCING APPARATUS HAVING AN AUTO TRACKING FUNCTION

BACKGROUND OF THE INVENTION

This invention generally relates to a video signal recording/reproducing apparatus having an auto tracking system in which piezoelectric ceramic head actuators are used.

Recently, an auto tracking system has been proposed in order to accurately trace previously recorded video tracks during a reproduction mode. The auto tracking system can reproduce pictures having no noise bars at a reproducing tape speed which is different from the recording tape speed. The different reproducing tape speed mode including a fast motion reproduction mode, a fast reverse motion reproduction mode, a slow motion reproduction mode, or a still reproduction mode, is called a trick motion reproduction mode.

The auto tracking system comprises piezoelectric ceramic head actuators having video heads (P) mounted thereon which are used for the trick motion reproduction mode, and auto tracking loops for driving the actuators so as to get maximum output signal levels from the video heads (P). The auto tracking loops are negative feed back loops.

This type of video signal recording/reproducing apparatus has two reproduction modes. The first reproduction mode is a normal reproduction mode in which the tape speed is equal to the tape speed used in the recording mode. The second reproduction mode is the trick motion reproduction mode in which the tape speed is different from the tape speed used in the recording mode.

In relation to the head configuration, two pairs of video heads have been proposed for a two head type of helical scanning video signal recording/reproducing apparatus. One pair of video heads $N_1$, $N_2$ are used for recording and reproducing pictures in the normal tape speed mode. Another pair of video heads $P_1$, $P_2$ are used for reproducing pictures in the trick motion reproduction mode. The video heads $N_1$, $N_2$ are fixed on a rotary disk so as to be 180° from each other. The video heads $P_1$, $P_2$ are mounted on piezoelectric ceramic actuators. The piezoelectric ceramic actuators are mounted on the rotary disk. The video heads $P_1$, $P_2$ are arranged so as to be 180° from each other. Each of the video heads $P_1$, $P_2$ is arranged so as to be 90° from each of the video heads $N_1$, $N_2$.

According to this type of video signal recording/reproducing apparatus, the pictures which are reproduced during the transistion time when the apparatus is switched from the first reproduction mode to the second reproduction mode have noise bars. If the auto tracking loop operates only in the second reproduction mode, the video heads $P_1$, $P_2$ are not controlled in advance. As a result, during the transition time from the first reproduction mode to the second reproduction mode, the video heads $P_1$, $P_2$ are not tracking the recorded video tracks.

On the other hand, in order to remove noise bars, a method for controlling video heads $P_1$, $P_2$ in the first reproduction mode has been proposed. But, a system characteristic deterioration is caused, (mainly, the supplied voltage-to-displacement characteristic is deteriorated), when to drive the piezoelectric ceramic actuators are driven in both the first and second reproduction modes.

SUMMARY OF THE INVENTION

Accordingly, an object of the present invention is to provide a video tape recorder/reproducer apparatus which reproduces pictures having considerably reduced noise bars that occur during the transition time when the apparatus switches from the first reproduction mode to the second reproduction mode.

Another object of the present invention is to provide a video tape recorder/reproducer which has a reduced deterioration of the characteristics of the piezoelectric ceramic actuators.

These and other objects can be accomplished by a video signal recording/reproducing apparatus having: a first rotary head which is mounted on a rotary disk; a second rotary head which is mounted on a head actuator which is also mounted on said rotary disk; and a negative feedback loop which detects the reproduced signal level of said second rotary head and drives said head actuator in order to increase said reproduced signal level of said second rotary head, the reproduction modes of said apparatus being a first reproduction mode in which the tape speed is equal to the tape speed used in a recording mode and a second reproduction mode in which the tape speed is different from the tape speed used in the recording mode, wherein, in said first reproduction mode, the signals reproduced by said first rotary head are demodulated and said negative feedback loop is intermittently close.

DESCRIPTION OF THE PREFERRED EMBODIMENT

Hereinafter, a preferred embodiment of this invention will be described in detail.

Figure 1:
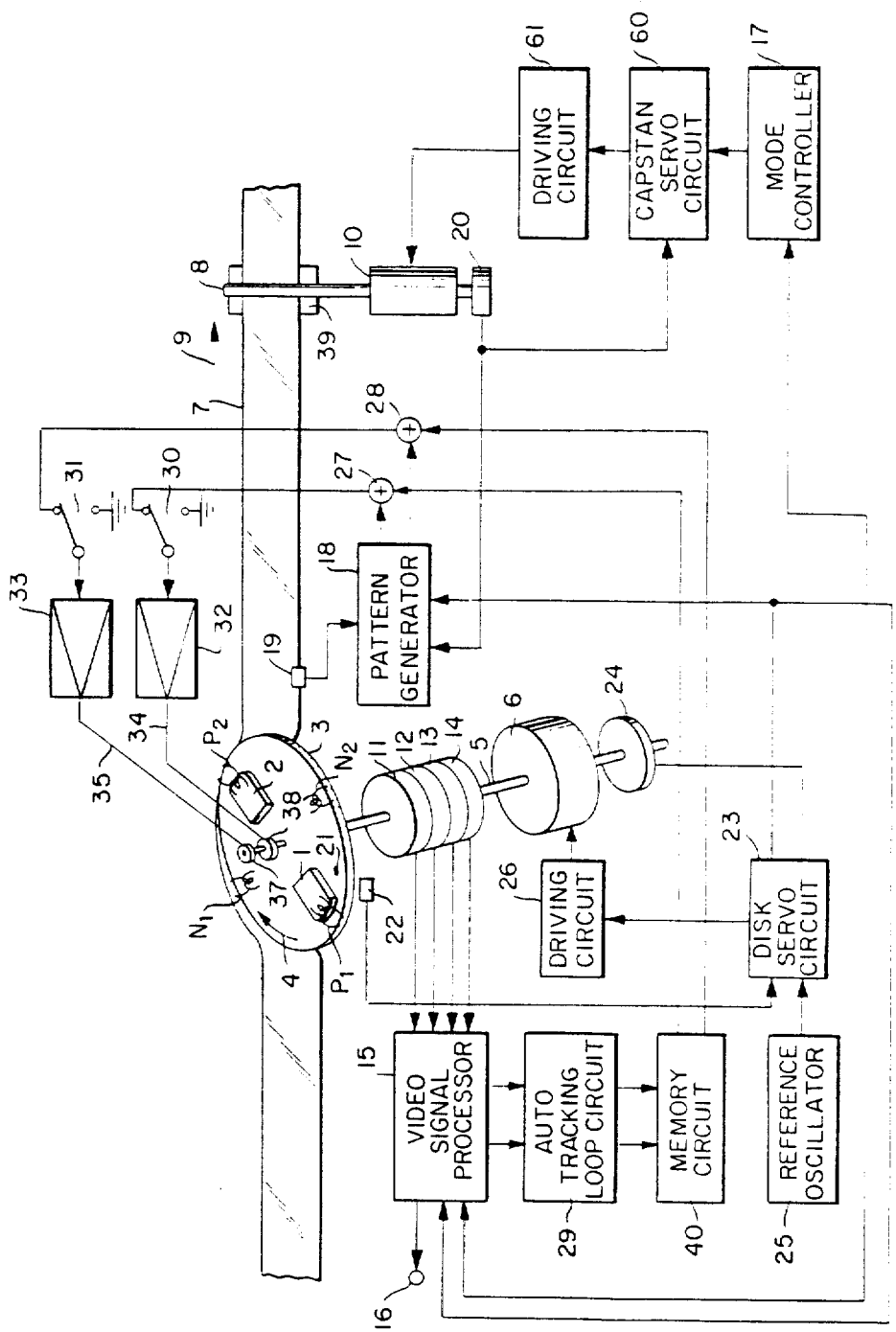
FIG. 1 is a block diagram of a video tape recorder/reproducer of this invention.

FIG. 1 shows a block diagram of a video tape recorder/reproducer of this invention when in its reproduction mode. In FIG. 1, $P_1$, $P_2$ are video heads which are mounted on moving sides of piezoelectric head actuators 1, 2. The azimuth angle of each of the video heads 1, 2 is 6°. The fixed sides of the piezoelectric head actuators 1, 2 are fixed on a rotary disk 3 which constitutes a rotary video head drum. The video heads $P_1$, $P_2$ are used for reproducing only, and are separated by 180° from each other. Video heads $N_1$, $N_2$ are separated by 180° from each other and are fixed on the rotary disk 3. Each of the video heads $N_1$, $N_2$ are separated by 90° from each of the video heads $P_1$, $P_2$. The rotary disk 3 is driven by a DC motor 6 through a shaft 5. The video heads $P_1$, $P_2$, $N_1$, and $N_2$ scan a video tape 7 on which video signals are recorded. The video tape 7 is driven by a capstan 8 and a pinchroller 39. The capstan 8 is driven by a capstan motor 10 which is controlled and driven by a capstan servo circuit 60 and a drive circuit 61. The reproduced signals from the video heads $P_1$, $P_2$, $N_1$, and $N_2$ are supplied to a video signal processor 15 through rotary transformers 11, 12, 13, 14. The output signal of the video signal processor 15 is supplied to an output terminal 16.

Now, we describe the operation of this apparatus when a mode controller 17 indicates the selection of the second reproduction mode.

Figure 2:
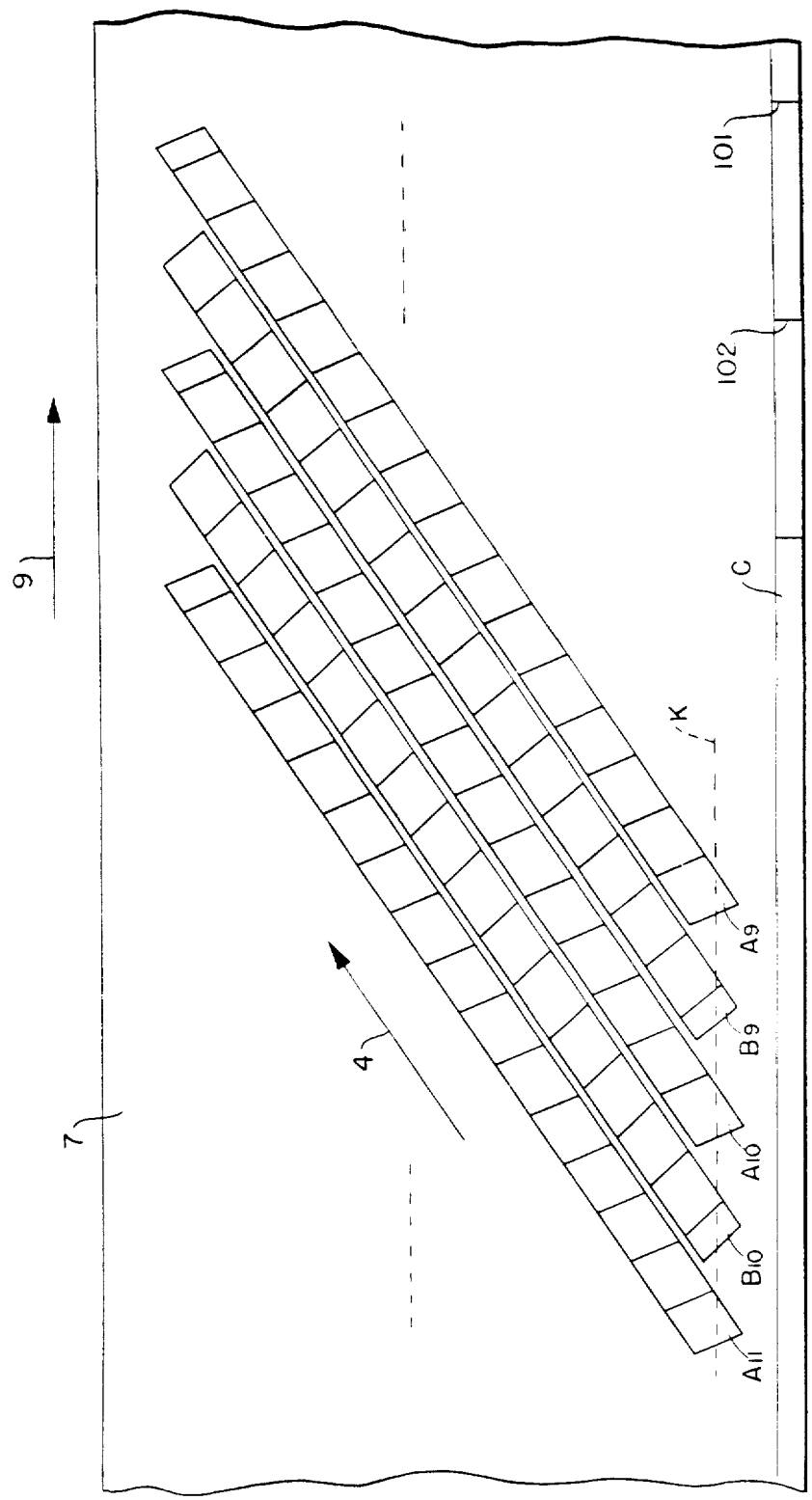
FIG. 2 is a recorded pattern on a magnetic tape.

FIG. 2 shows a recorded track pattern on the video tape 7. In FIG. 2, $A_9$, $A_{10}$ and $A_{11}$ are video tracks which are recorded by a video head whose azimuth is $+6°$. The length of a one track is one field of video signal. $B_9$ and $B_{10}$ are video tracks which are recorded by another video head whose azimuth is $-6°$. C is a control track. 101 and 102 are recorded control signals. Each of the control signals is recorded in each picture frame. The control signals are reproduced by a control head 19 and supplied to a pattern generator 18. Each of the reproduced control signals will be canceled control signal R. In order to increase a tape position detection resolution, a sub control Q having no connection with the tape speed is supplied to the pattern generator 18. In general, the sub control signal is generated by a revolution-indicator which rotates with the movement of the video tape. In FIG. 1, the sub control signal Q is generated by a pulse generator 20 which is directly coupled to the capstan 8. The pulse generator 20 generates ten sub control signals Q for every interval of the control signal R. This means that the tape position detecting resolution is improved ten times. A rotary phase signal for each of the video heads $P_1$, $P_2$, which has been detected by a rotary phase detector 22, is supplied to the pattern generator 18. This signal is called the head switching signal S and is supplied from a disk servo circuit 23. A detecting head 22 detects the rotary phase of a magnet 21 which is fixed on the rotary disk 3. The output signal from the detecting head 22 are supplied to the disk servo circuit 23. The rotary disk 3, the DC motor 6, a frequency generator 24, a reference oscillator 25 and a driving circuit 26 from a disk servo system.

Figure 3:
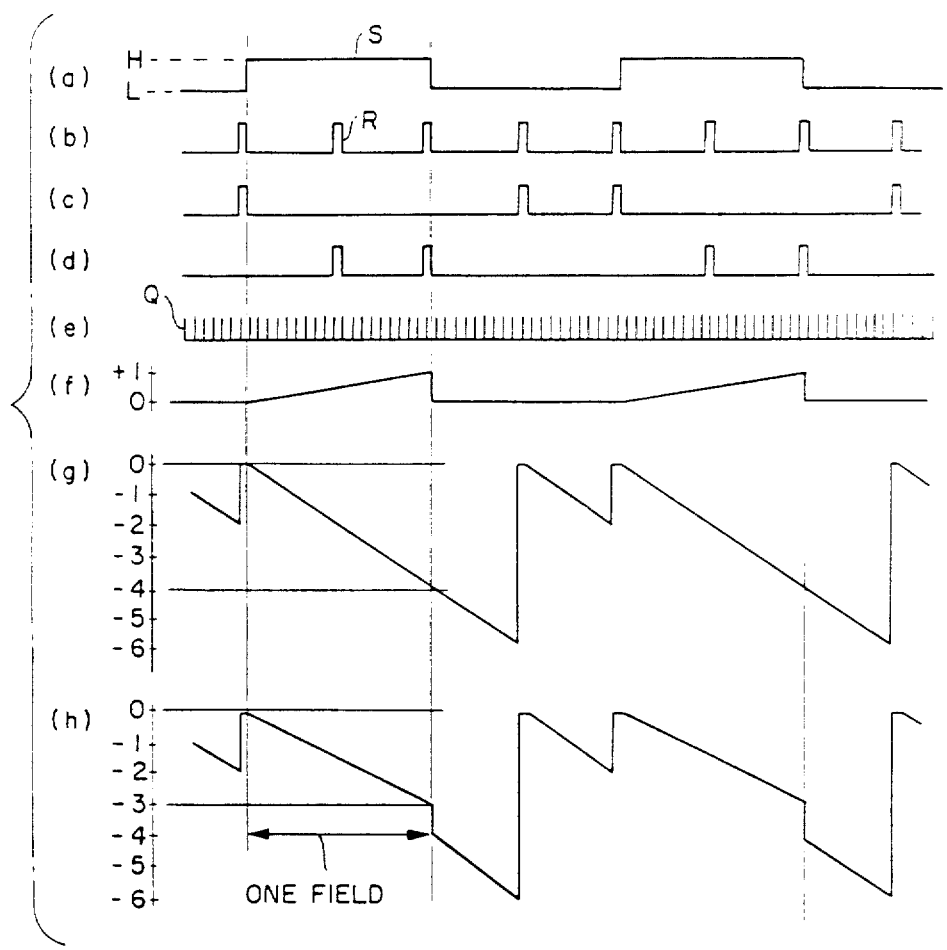
FIGS. 3 (a)~(h) are waveform diagrams of signals appearing at various points in FIG. 1.

FIGS. 3 (a), (b), (c) show one example of the phase relationship of the head switching signal S, the control signal R and the sub control signal Q during a four times normal speed reproduction mode. The leading edge of the head switching signal S in FIG. 3 (a) coincides with the time when the video head $P_1$ scans a dotted line K in FIG. 2. The trailing edge of the head switching signal S coincides with the time when the video head $P_2$ scans the dotted line K in FIG. 2

Figure 4:
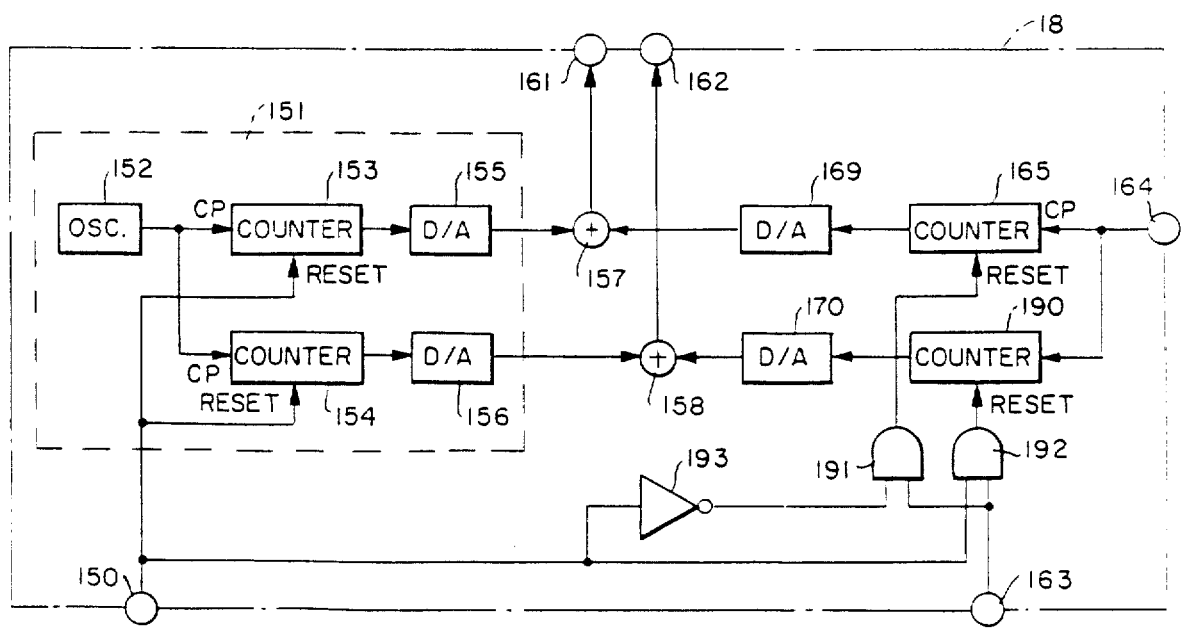
FIG. 4 is a block diagram of an embodiment of a pattern generator in FIG. 1.

FIG. 4 shows a block diagram of an example of the pattern generator 18. The head switching signal S is supplied to an input terminal 150. The control signal R is supplied to an input terminal 163. The sub control signal Q is supplied to an input terminal 164. The sub control signal Q is supplied to the CP(i.e.—close pulse) terminals of counter 165 and 190. The control signal R and the head switching signal S are supplied to an inverter 193 and AND gates 191, 192. The output signals of the AND gates 191, 192, which are shown in FIGS. 3 (c), (d) are respectively supplied to the reset terminals of the counters 165, 190. The output signals of the counter 165 are converted to an analog signal by a D/A (digital-to-analog) converter 169. FIG. 3(g) shows the converted signal. In FIG. 3(g), the scale on the vertical axis corresponds to the video track pitch shown in FIG. 2. In the same way, the output signal of a D/A converter 170 is obtained.

Still pattern signals are added to the output signals of the D/A converters 169, 170 by adders 157, 158. The still pattern signals are generated by a still pattern generator 151. The still pattern generator 151 is formed by an oscillator 152, counters 153, 154, and D/A converters 155, 156. The oscillator 152 generates five pulses in one field. The pulses generated by the oscillator 152 are supplied to the CP terminals of the counters 153, 154. The head switching signal S is supplied to the reset terminals of the counters 153, 154. The counter 153 is activated when the level of the head switching signal S is high, and reset when the level of the head switching signal S is low. The counter 154 is activated when the level of the head switching signal S is low, and reset when the level of the head switching signal S is high. FIG. 3(f) shows the output signal of the D/A converter 155. The D/A converter 156 supplies a signal which is similar to the output signal of the D/A converter 155. These signals are called the still pattern signals. The output signal of the adder 157 is added with the output signal of an auto tracking loop circuit 29 through a memory circuit 40 by an adder 27. The output signal of the adder 27 is shown in FIG. 3(h). The output signal of the adder 27 is supplied to a piezoelectric ceramic actuator 1 through a switch circuit 30, a high voltage amplifier 32, a conductive brush 34 and a slip ring 38. When the output signal of the auto tracking loop circuit 29 is zero, the signal in FIG. 3(h) is amplified and supplied to the piezoelectric ceramic actuator 1. The scale of the vertical axis of FIG. 3(h) corresponds to the pitch of the video tracks shown in FIG. 2.

The signal of the first field in FIG. 3(h) drives the piezoelectric ceramic actuator 1 at four times the speed of the normal reproduction mode. As a result, the video head $P_1$ can trace the $A_9$ track shown in FIG. 2. The output terminal 162 supplies a signal similar to that output from the output terminal 161. The output signal from the output terminal 162 is supplied to a piezoelectric ceramic head actuator 2 through an adder 28, a switch circuit 31, a high voltage amplifier 33, a conductive brush 35 and a slip ring 37. As a result, at any multiple of the normal reproduction tape speed, the pattern generator 18 drives the video heads $P_1$, $P_2$ so as to be on track.

But, in the case of the recording phase of a control signal 101 shifting to the track $A_9$, the video head $P_1$ cannot track the track $A_9$ during the first field. This phase shifting is corrected by the output signal of the auto tracking loop circuit 29. The output signals of the video heads $P_1$, $P_2$ and the head switching signal S are supplied to the auto tracking loop circuit 29. The auto tracking loop circuit 29 supplies correction signals to the adders 27, 28 which are proportional to the off tracking of the video heads $P_1$ and $P_2$. The technique of the auto tracking loop circuit 29 is conventional.

In this manner, in the second reproduction mode, the output signals of the pattern generator 18 and the auto tracking loop circuit 29 drive the video heads $P_1$, $P_2$ to so as to be on track. In the first reproduction mode, the output signals of the video heads $N_1$, $N_2$ are supplied to the video signal processor 15. Video signals which are demodulated by the video signal processor 15 are supplied to the output terminal 16. In the first reproduction mode, the output signals from the video heads $P_1$, $P_2$ are not necessary. But, in order to reproduce pictures with no noise bar during transition period when the apparatus switches from the first reproduction mode to the second reproduction mode, it is necessary that the pattern generator 18 and the auto tracking loop circuit 29 be continuously activated and the piezoelectric ceramic actuators driven.

The deterioration of characteristics of the piezoelectric ceramic actuators 1, 2 are accelerated if the piezoelectric ceramic actuators 1, 2 are always driven. The deterioration is undesirable.

Figure 5:
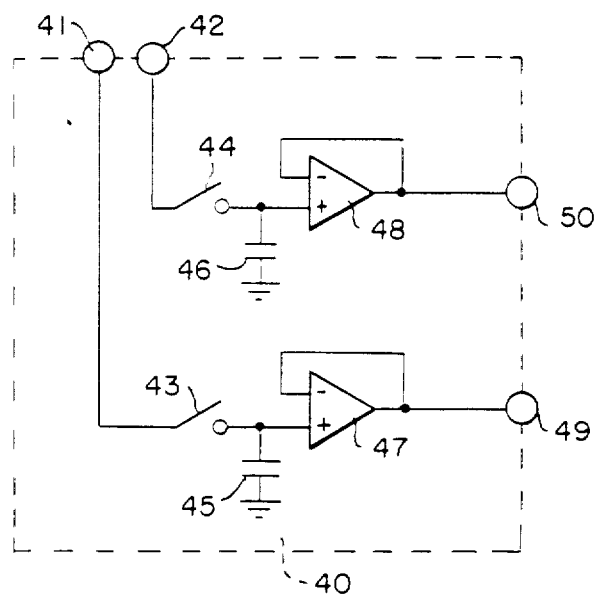
FIG. 5 is a block diagram of an embodiment of a memory circuit in FIG. 1.

In order to solve this problem, in this invention, the switch circuits 30, 31 are used. In the first reproduction mode, the switch currents 30, 31 intermittently supply signals to the piezoelectric ceramic actuators 1, 2. The auto tracking loop circuit 29 is connected to a memory circuit 40. The memory circuit 40 is inserted between the auto tracking loop circuit 29 and the adders 27, 28. In FIG. 5, a circuit diagram of an example of the memory circuit 40 is shown. The output signal of the auto tracking loop circuit 29 is supplied to switches 43, 44 through input terminals 41, 42.

Figure 6:
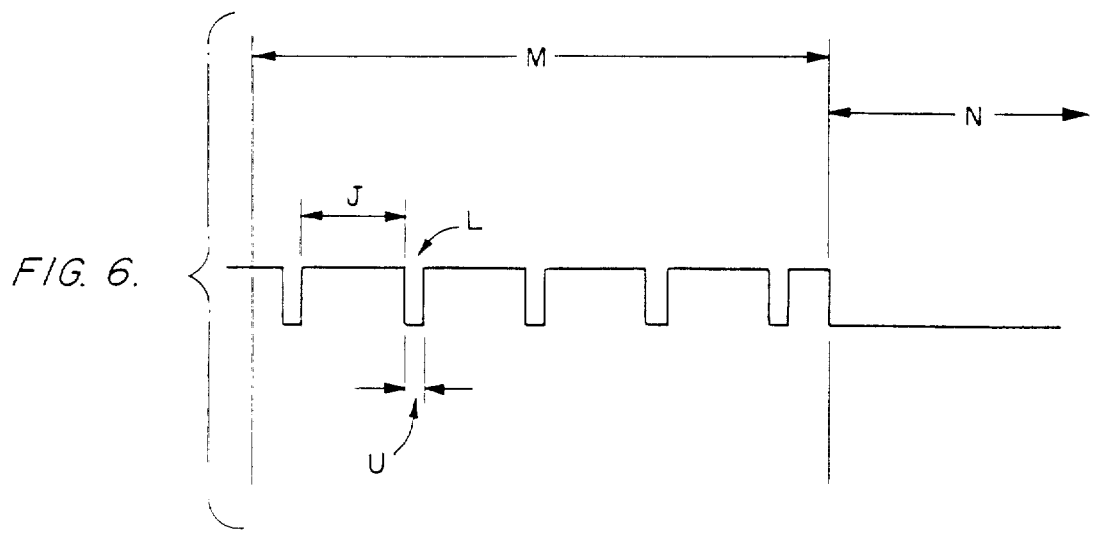
FIG. 6 is an explanatory timing chart showing an operation of a auto tracking loop of this invention.

In FIG. 6, the period M is the first reproduction mode period and the period N is the second reproduction mode period. In the first reproduction mode, the switches 43, 44 are intermittently closed. In FIG. 6, during period J, the switches 43, 44 are opened. During period U, the switches 43, 44 are closed. At time L in FIG. 6, that is, the end of the period U, the input signal levels are held by capacitors 45, 46.

The levels of the held signals are supplied to output terminals 49, 50 through operational amplifiers 47, 48. When the switches 43, 44 are closed, the input signals are directly supplied to the output terminal 49, 50. The switching of the switches 43, 44 is synchronized with the switching of the switch circuits 30, 31. In the second reproduction mode, the switches 43, 44 are closed. For example, the memory circuit 40 can also be formed of a digital memory circuit which includes flip-flop circuits.

In the inventors' experience, it is desirable that the holding time (period J) be about five minutes. The operating time (period U) of the auto tracking loop circuit 29 and the switching circuit 30, 31 are about two seconds in the first reproduction mode.

By the above described construction, (i) during the transition period from the first reproduction mode to the second reproduction mode, the reproduced pictures have almost no noise bars, and (ii) in the first reproduction mode, the driving period of the piezoelectric ceramic actuator is by about 1/150 when compared with the method of continuous driving. As a result, the deterioration of the characteristics of the piezoelectric ceramic actuator is significantly reduced.

What is claimed is:

1. A video tape recording/reproducing apparatus having an auto tracking function and having a first reproduction mode with a first tape speed corresponding to that used in a recording mode and a second reproduction mode with a second tape speed which is different from that of said first tape speed, said apparatus comprising:

a first rotary head used for said first reproduction mode and mounted on a rotary disk;

a second rotary head used for the second reproduction mode and mounted on a heat actuator which is in turn mounted on said rotary disk;

an auto tracking loop circuit coupled to said second rotary head for outputting a correction signal for correcting tracking of said second rotary head when said second rotary head is shifted from being on track;

a memory circuit coupled to said auto tracking loop circuit and including a memory element and also including a first switch for storing, during said first reproduction mode, an output signal from said auto tracking loop circuit, said storing effected by said memory element for a first period of time by selectively opening said first switch and for passing during said same first reproduction mode an output signal from said auto tracking loop circuit to an output thereof for a second period of time by closing said first switch;

and a second switch coupled between said output of said memory circuit and said head actuator for supplying said correction signal to said head actuator for said second period of time by closing said second switch for said second period of time and for preventing supply of said correction signal to said head actuator for said first period of time by opening said second switch for said first period of time;

wherein said output signal of said auto tracking loop circuit stored by said memory circuit for said first period of time has a signal level equal to a signal level thereof at an end of said second period of time, and said second period of time is preliminarily selected so as to minimize deterioration of said head actuator.

2. An apparatus according to claim 1, wherein upon a transition of said apparatus from said first reproduction mode to said second reproduction mode, both said first switch and said second switch are closed, and are kept closed during said second reproduction mode.

* * * * *